Nov. 9, 1954
L. KOVACH
2,693,861
AUTOMATIC SPEED CONTROLLING DEVICE FOR AUTOMOBILES
Filed Nov. 17, 1951
2 Sheets-Sheet 1
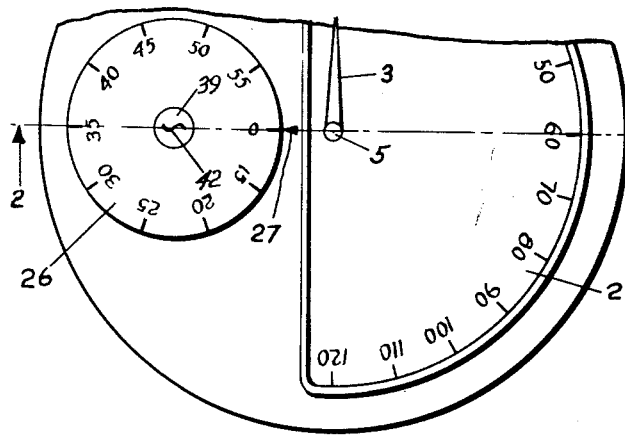
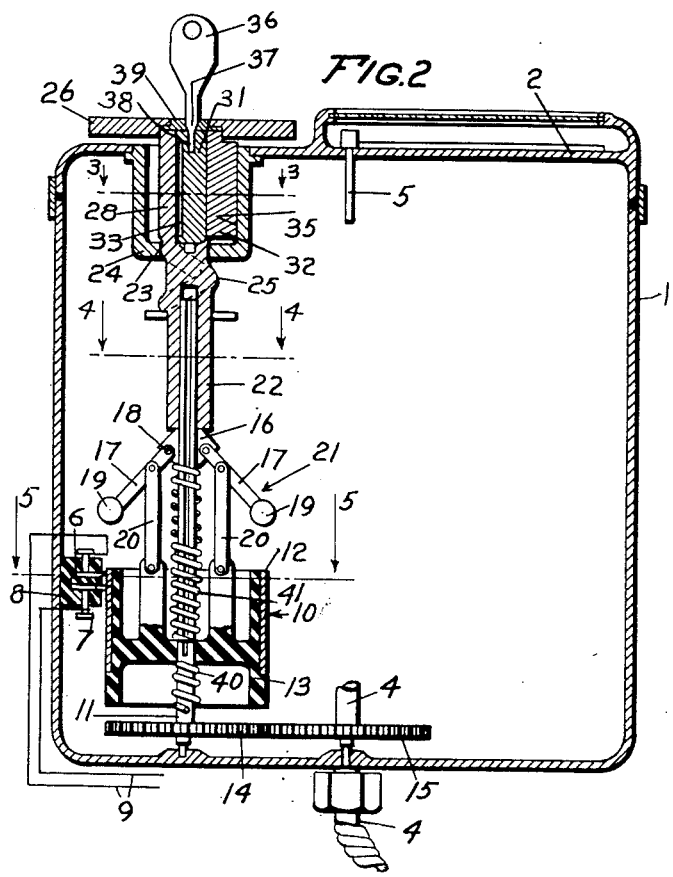
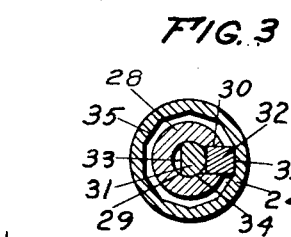
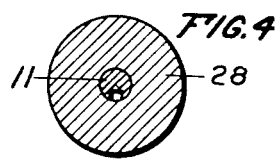
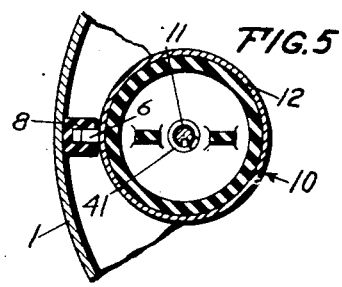
INVENTOR
LESLIE KOVACH
BY Louis C. Smith
ATTORNEY Nov. 9, 1954  L. KOVACH  2,693,861
AUTOMATIC SPEED CONTROLLING DEVICE FOR AUTOMOBILES
Filed Nov. 17, 1951  2 Sheets-Sheet 2
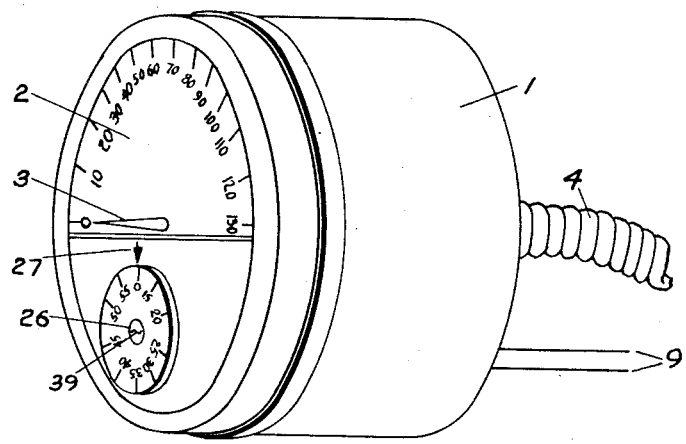
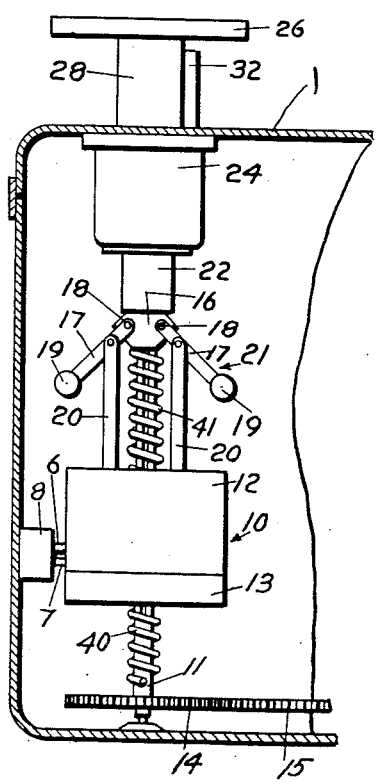
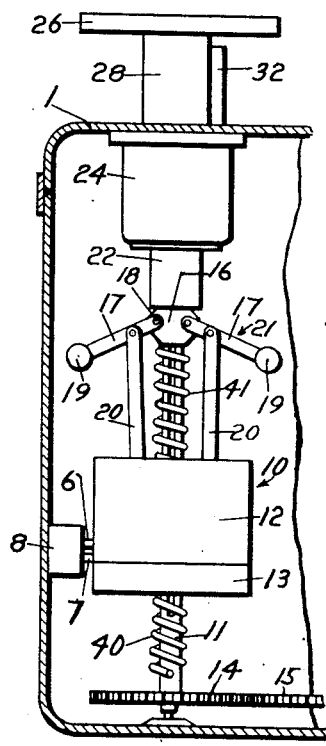
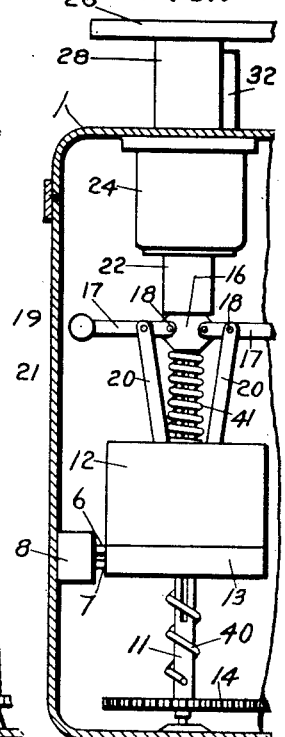
INVENTOR
LESLIE KOVACH
BY Louis C. Smith
ATTORNEY

United States Patent Office 2,693,861
Patented Nov. 9, 1954

2,693,861
AUTOMATIC SPEED CONTROLLING DEVICE FOR AUTOMOBILES

Leslie Kovach, Boston, Mass., assignor, by mesne assignments, to Morton Levine, Leominster, Mass.

Application November 17, 1951, Serial No. 256,931

3 Claims. (Cl. 180—82.1)

This invention relates to a speed controlling device for automobiles and particularly to that type of device which operates to open the ignition circuit of the automobile engine when the automobile exceeds a predetermined maximum speed.

One object of the invention is to provide a device of this type having means for setting the circuit-opening means so that the ignition circuit will be opened at any one of a plurality of different maximum speeds.

A further object of the invention is to provide means for locking the setting or adjusting means so that it cannot be tampered with after it has once been set for a predetermined maximum speed.

In the drawings, wherein I have illustrated a selected embodiment of the invention, Fig. 1 is a fragmentary end view of a speedometer for an automobile having my improved speed controlling mechanism associated therewith;

Fig. 2 is a section on the line 2—2 Fig. 1;

Fig. 3 is a section on the line 3—3 Fig. 2;

Fig. 4 is an enlarged section on the line 4—4 Fig. 2;

Fig. 5 is a section on the line 5—5 Fig. 2;

Fig. 6 is a perspective view of a speedometer having my improved controlling device associated therewith;

Figs. 7, 8, and 9 are partial sectional views illustrating the manner in which the ignition circuit is opened by the controlling mechanism when the automobile reaches or exceeds a predetermined maximum speed.

In the drawings, 1 indicates the casing of a speedometer which is provided with the usual graduated dial 2, and 3 indicates the pointer or indicator which is actuated by the speedometer mechanism and which moves over the dial 2 to indicate the speed at which the automobile is traveling.

4 indicates the usual speedometer shaft by which the speedometer mechanism is operated. The speedometer mechanism itself is not illustrated herein as it forms no part of the present invention and may be of any usual type. It is sufficient to say, however, that said mechanism includes a shaft 5 on which the pointer or indicator 3 is mounted, which shaft is turned about its axis and maintained in a position so that the indicator 3 will indicate correctly the speed of the automobile.

My improved controlling mechanism includes two contacts or brushes 6, 7, which are mounted in a block 8 of insulating material that is secured to one wall of the casing 1. These brushes are connected in series in the ignition circuit 9 of the automobile engine.

Associated with the contacts 6, 7, is a cylindrical contact member 10 of insulating material which is mounted on a shaft 11 and which has a circumferential band 12 of conducting material which however does not extend the full length of the cylinder so that the end portion 13 of the cylinder presents a surface of insulating material. The surface of the cylindrical contact member is thus provided with a circumferential zone of conducting material, the zone formed by the band 12, and an adjacent circumferential zone of non-conducting material, which is constituted by the lower portion 13 of the contact member below the band 12.

The contact member is splined to the shaft 11 and hence is capable of moving axially of the shaft.

Said shaft 11 is connected to the speedometer shaft 4 by suitable gearing 14, 15 so that said shaft 11 rotates synchronously with the speedometer shaft 4.

So long as the contact member 10 is positioned on the shaft 11 so that both brushes engage the band 12, said band will bridge the contacts 6 and 7 and the ignition circuit 9 will be closed, but when said contact member is moved axially of the shaft into a position in which one or both of the brushes 6, 7, contacts with the zone of insulating material, then the ignition circuit will be opened and consequently the automobile engine will cease to function. When the band 12 is bridging the contacts 6 and 7 thereby closing the ignition circuit, said band forms part of the circuit and carries the current from one contact brush to the other.

My invention includes means responsive to an increasing speed of the shaft 11 to move the contact member 10 axially of the shaft and it also involves means for initially setting or adjusting the contact member 10 so that the opening of the ignition circuit by the axial movement of the contact member 10 will occur when the automobile has reached any desired predetermined speed.

Mounted on the shaft 11 is a centrifugal governor 21 which operates as the speed of the shaft 11 increases to move the contact member 10 upwardly on said shaft. The governor herein shown is of the familiar type comprising a hub 16 mounted on the shaft 11 and rotatable therewith and two arms 17 pivotally connected to the hub at 18 and each having a weight 19 at its end. The arms 17 are connected to the contact member 10 by means of suitable links 20.

With this arrangement the centrifugal force of the weights 19 will tend to swing them outwardly and upwardly as the rotative speed of the shaft 11 increases and such outward and upward swinging movement of the arms 11 will raise the contact member 10 relative to the shaft.

As stated above, the device includes means for initially setting the contact member 10 in various positions lengthwise of the shaft 11. If, for instance, said member is initially set in the position shown in Fig. 7, so that the brushes 6 and 7 are near the lower end of the band 12, then as the speed of the shaft 11 increases, the centrifugal force of the weights 19 will move the arms 17 outwardly, as shown in Figs. 8 and 9, thereby raising the contact member 10, and when said member has been raised to a point where one or both of the brushes contact with the circumferential zone of insulating material, that is, the zone below the band 12, as shown in Fig. 9, the ignition circuit 9 will be opened and consequently the automobile engine will cease to function. As the speed of the automobile slows down the governor will respond to the decreasing speed and the contact member 10 will move downwardly until both brushes 6, 7, are again in contact with the band 12, at which time the ignition circuit will be again closed.

As stated above, my invention includes means for initially setting the contact member 10 and governor 21 in any one of a plurality of different positions relative to the brushes 6, 7. This means comprises a positioning member 22 which constitutes a bearing for the upper end of the shaft 11 which extends through the end wall 23 of a stationary housing 24 that is rigidly secured to the casing 1. The positioning member 22 is provided with a coarse screw thread 25 which has screw threaded engagement with the end wall 23 of the housing and the upper end of the member 22 has rigid therewith a disk 26 by which said member can be turned.

40 indicates a spring which encircles the shaft 11 below the contact member 10 and counterbalances the combined weight of the latter and the governor 21 and thus maintains the hub 16 of the governor against the lower end of the positioning member 22 as it is adjusted upwardly. Another spring 41 encircling the shaft 11 between the contact member 10 and the hub 16 cooperates with the weights 19 to hold the arms 17 in their lowered position when the shaft 11 is at rest.

Because of the screw threaded engagement of the member 22 with the end wall 23 of the casing 24, turning movement of the member 22 will cause it to move in the direction of its length and thereby the governor 21 and the contact member 10 are adjusted bodily as a unit longitudinally of the shaft 11. The disk 26 is graduated to indicate different predetermined maximum speeds and it cooperates with an index marking member 27 by which the setting of the disk 26 can be read.

Because of the coarse screw thread 25 one complete turn of the setting disk 26 will move the member 22 from its lower limit to its upper limit.

If, for instance, it is desired to set the device so that the ignition circuit 9 will be opened when the automobile reaches a speed of say thirty miles, the disk 21 will be adjusted to bring the "30" marking thereon in register with the index marking 27 and this will place the positioning member 22 in a position such as that indicated in Fig. 7 wherein the brushes 6, 7, are adjacent the lower edge of the band 12, this position being such that when the 30-mile maximum speed limit of the automobile has been attained the arms 17 of the governor member will have been thrown upwardly and outwardly into a position to raise the contact member sufficiently so that one or both of the contacts are in engagement with the insulated zone 13 of the contact member, thereby opening the ignition circuit.

If a maximum speed of fifty miles is desired then the disk 26 will be set to bring the "50" marking thereon into register with the index marker 27 and the positioning member will then be set so that a speed of fifty miles an hour will be required to raise the contact member into a position to open the ignition circuit.

My invention also includes means to lock the positioning member 22 in any adjusted position, and the lock used is preferably a key-operated lock so that the lock cannot be released except by using a special key and therefore can only be released by a person who has such a key.

The portion 28 of the positioning member 22 within the casing 24 has a central bore 29 and a laterally extending slot 30. The bore 29 receives a cam member 31 and the slot 30 receives a locking member in the form of a block 32. The cam member 31 presents a flat side 33 and a parti-cylindrical surface 34. When the locking member is in the position shown in Fig. 3 the cylindrical surface 34, by its engagement with the block 32, forces the latter against the inner wall of the housing 24, but when the cam member 31 is turned to bring the flat face 33 into alignment with the block 32 said block can move inwardly out of engagement with the wall of the casing 24.

The inner surface of the casing wall is made with a plurality of flat faces 35, there preferably being the same number of flat faces as there are numbered graduations on the disk 26.

In order to set the positioning member 22 for any desired speed the cam member 31 is turned 180° from its position shown in Fig. 3 to present the flat face 33 to the locking block 32. The member 22 can then be turned to bring any desired graduation thereon into register with the index 27 and when said member has been thus set the cam member 31 may be turned into the position shown in Fig. 3, thereby forcing the block 32 against one of the flat faces 35, and thereby locking the positioning member in its adjusted position.

For thus turning the cam member 31 there is provided a key 36 having an end 37 to fit into a socket 38 formed in the upper end of the cam member, the shape of the end 37 of the key and the socket being such that turning of the key will impart turning movement to the cam member.

The disk 26 is provided with a central opening in which is loosely received a collar 39 provided with a key slot 42 of a size and shape to receive the key 36. The collar 39 is turnable in the disk 26 and is preferably connected to the cam member 31 to turn therewith.

With this arrangement it will be apparent that the positioning member 22 can be locked or unlocked in adjusted position only by the use of the special key 36.

If it is desired to set the controlling mechanism for an unlimited speed, the governor and the contact member 10 will be initially adjusted so that even when the governor is rotating at maximum speed with the arms horizontal, both contacts 6, 7, will still be on the band 12 of conducting material.

I claim:

1. In a speed controlling device for automobiles of the type having a rotary centrifugal governor, driving means to rotate the governor at varying speeds corresponding to the varying speeds of the automobile, a fixed contact and a movable contact connected to the governor and movable thereby relative to the fixed contact to open the ignition circuit of the automobile whenever the speed of the automobile is increased to a predetermined point, the combination with said governor and movable contact, of means to adjust the governor and movable contact bodily as a unit in an axial direction thereby to provide for opening the ignition circuit at different predetermined maximum speeds of the automobile, said means comprising a housing, a governor-positioning member axially alined with the governor and having an end portion thereof located within said housing, said governor-positioning member and housing having cooperating portions by which turning movement of the governor-positioning member about its axis is translated into axial movement thereof, a locking member located within the housing and carried by the governor-positioning member to rotate therewith, and means to lock said locking member to the wall of the housing in any adjusted position of said governor-positioning member.

2. A speed controlling device for automobiles as defined in claim 1 wherein the locking member is movable radially of the governor-positioning member and the interior face of the housing presents a plurality of contiguous flat faces, and means are provided to move the locking member radially to clamp it against any one of the flat faces thereby to lock the governor-positioning member in a desired position.

3. In a speed controlling device for automobiles of the type having a rotary centrifugal governor, driving means to rotate the governor at varying speeds corresponding to the varying speeds of the automobile, a pair of contacts for closing the ignition circuit of the automobile and means connected to the governor to open the contacts when the speed of the automobile is increased to a predetermined point, thereby opening the ignition circuit, the combination with said governor and contacts, of means to adjust at least one of the contacts thereby to provide for opening the ignition circuit at different speeds of the automobile, said means comprising a housing, a positioning member within the housing capable of turning movement, said positioning member and housing having cooperating portions by which the turning movement of the positioning member is translated into an axial movement thereof, means connecting said positioning member to the adjustable contact whereby the latter is adjusted by the axial movement of said positioning member, a locking member located within the housing and carried by the positioning member, and key-operated means to lock said locking member to the wall of the housing in any adjusted position of the positioning member.

References Cited in the file of this patent

UNITED STATES PATENTS

| Number | Name | Date |
| --- | --- | --- |
| 910,414 | Perrin | Jan. 19, 1909 |
| 1,012,611 | Davis | Dec. 26, 1911 |
| 1,117,361 | Evans | Nov. 17, 1914 |
| 1,384,730 | Crawford | July 12, 1921 |
| 1,401,396 | Davis | Dec. 27, 1921 |
| 1,634,069 | Cordray | June 28, 1927 |